United States Patent
Wang et al.

(10) Patent No.: US 10,044,705 B2
(45) Date of Patent: Aug. 7, 2018

(54) SESSION MANAGEMENT FOR INTERNET OF THINGS DEVICES

(71) Applicant: Facebook, Inc., Menlo Park, CA (US)

(72) Inventors: Xinlei Wang, Seaside, CA (US); Francislav P. Penov, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 200 days.

(21) Appl. No.: 15/001,611

(22) Filed: Jan. 20, 2016

(65) Prior Publication Data
US 2017/0208057 A1    Jul. 20, 2017

(51) Int. Cl.
| | |
|---|---|
| G06F 7/04 | (2006.01) |
| H04L 29/06 | (2006.01) |
| H04W 12/04 | (2009.01) |
| G06F 15/16 | (2006.01) |
| H04W 4/70 | (2018.01) |
| H04W 4/00 | (2018.01) |
| H04W 12/08 | (2009.01) |

(52) U.S. Cl.
CPC ........... H04L 63/083 (2013.01); H04W 12/04 (2013.01); *H04L 63/105* (2013.01); *H04W 4/005* (2013.01); *H04W 4/70* (2018.02); *H04W 12/08* (2013.01)

(58) Field of Classification Search
CPC .......................... H04L 63/0876; H04L 63/20
USPC ..... 726/1; 709/229; 713/172, 175, 151, 155, 713/173, 174, 182, 183; 380/229
See application file for complete search history.

(56) References Cited

U.S. PATENT DOCUMENTS

| | | | | |
|---|---|---|---|---|
| 9,094,407 B1* | 7/2015 | Matthieu | ................ | H04W 4/70 |
| 2007/0067817 A1* | 3/2007 | Hamilton | ................ | H04L 63/08 |
| | | | | 725/100 |
| 2007/0094721 A1* | 4/2007 | Nguyen | ................ | G06Q 50/34 |
| | | | | 726/9 |
| 2007/0113073 A1* | 5/2007 | Maillard | ................ | H04N 5/913 |
| | | | | 713/156 |
| 2009/0196200 A1* | 8/2009 | Moritomo | ............. | H04W 16/00 |
| | | | | 370/254 |
| 2011/0249079 A1* | 10/2011 | Santamaria | ......... | H04M 7/0057 |
| | | | | 348/14.02 |
| 2012/0180123 A1* | 7/2012 | Kuenzi | ................... | G06F 21/34 |
| | | | | 726/20 |
| 2012/0243547 A1* | 9/2012 | Pardo-Blazquez | ..... | H04L 12/14 |
| | | | | 370/401 |

(Continued)

*Primary Examiner* — Gary S Gracia
(74) *Attorney, Agent, or Firm* — FisherBroyles, LLP

(57) ABSTRACT

The disclosure is directed to security management in communications involving computing devices, e.g. Internet of Things (IoT) devices. An IoT device can perform various activities, e.g., social networking activities, for or on behalf of a user. An IoT device is typically insecure, especially when accessing user data. To control the type of activities that can be performed by various types of devices, a server device ("server") can issue different types of tokens to different IoT devices. Which token an IoT device has determines the types of activities the IoT device can perform. For example, the server can issue a restricted token, which restricts the type of activities an IoT device can perform, and an unrestricted token to a more secure device, e.g., a smartphone, that can perform a broader range of activities. For example, the restrictive token may not permit the IoT device to change the password of a user.

18 Claims, 8 Drawing Sheets

(56) References Cited

U.S. PATENT DOCUMENTS

| | | | |
|---|---|---|---|
| 2013/0047266 A1* | 2/2013 | Radhakrishnan | H04L 63/0807 726/28 |
| 2013/0060912 A1* | 3/2013 | Rensin | G06F 17/30041 709/219 |
| 2014/0075568 A1* | 3/2014 | Sathyadevan | G06F 21/554 726/27 |
| 2014/0136638 A1* | 5/2014 | Zhang | H04L 51/04 709/206 |
| 2014/0237236 A1* | 8/2014 | Kalinichenko | G06F 21/43 713/168 |
| 2014/0253740 A1* | 9/2014 | Barnwal | G06F 3/005 348/207.1 |
| 2014/0274123 A1* | 9/2014 | Nixon | G05B 11/01 455/456.1 |
| 2015/0358304 A1* | 12/2015 | Beckhardt | H04L 65/60 726/4 |
| 2016/0043962 A1* | 2/2016 | Kim | H04L 67/02 709/224 |
| 2016/0044040 A1* | 2/2016 | Caffary, Jr. | G06F 21/6218 726/4 |
| 2016/0072670 A1* | 3/2016 | Matthieu | H04L 67/12 709/204 |
| 2016/0072839 A1* | 3/2016 | Mortimore, Jr. | H04L 63/20 726/1 |
| 2016/0134660 A1* | 5/2016 | Ponsini | H04L 63/20 726/1 |

\* cited by examiner

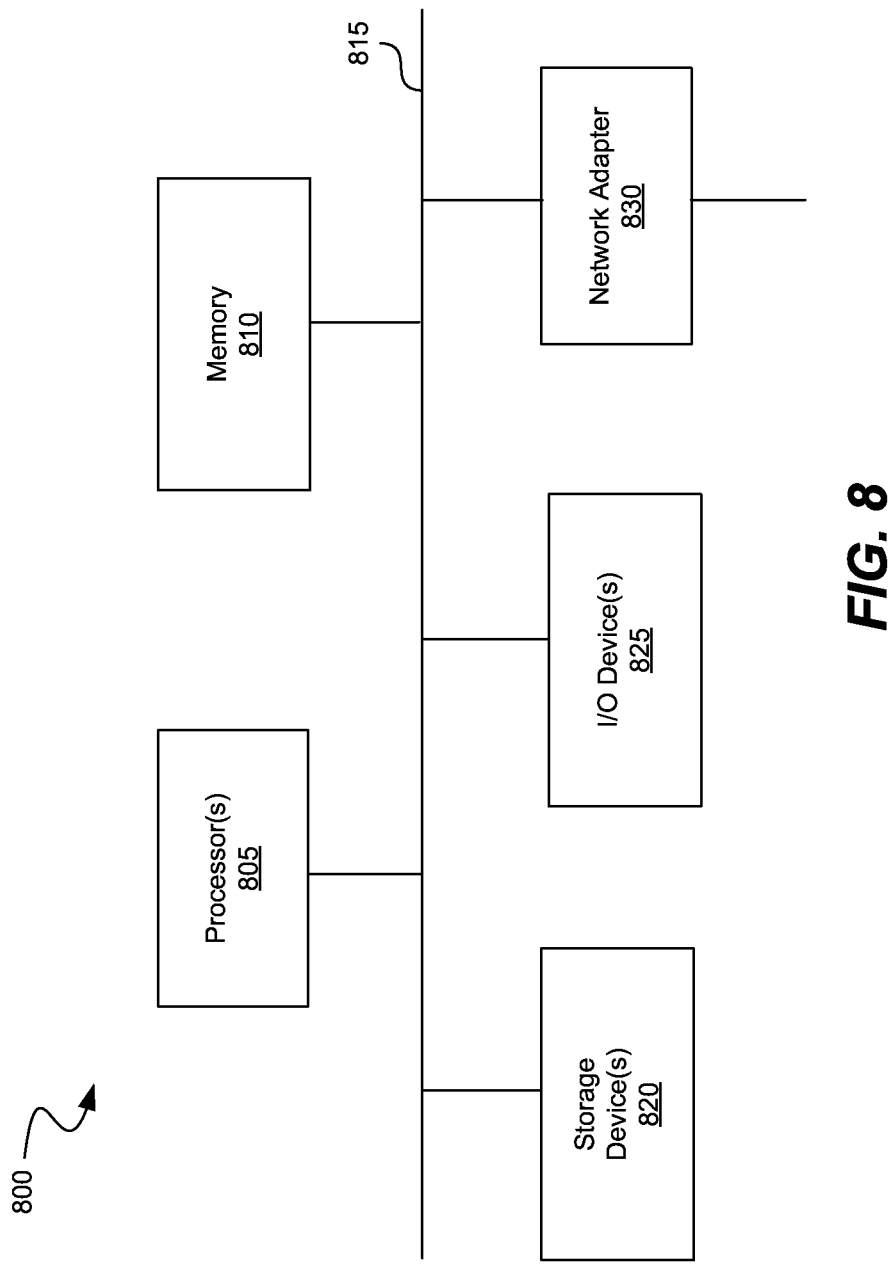

SESSION MANAGEMENT FOR INTERNET OF THINGS DEVICES

BACKGROUND

The Internet of Things (IoT) is a network of physical objects or "things" embedded with electronics, software, sensors, and network connectivity, which enables these objects to collect and exchange data. The IoT can allow the objects to be sensed and controlled remotely across various network infrastructure, creating opportunities for more direct integration between the physical world and computer-based systems, and can result in improved efficiency, accuracy and economic benefit. Each IoT device can be uniquely identifiable through its embedded computing system and can be able to interoperate within the existing Internet infrastructure.

The IoT devices can have limited processing, memory and power resources, but the ability to network such devices can mean that IoT finds applications in various fields. For example, an IoT device can collect information in settings ranging from natural ecosystems to buildings and factories, thereby finding applications in fields of environmental sensing and urban planning. On the other hand, IoT systems could also be responsible for performing actions, not just sensing things. Intelligent shopping systems, for example, could monitor specific users' purchasing habits in a store by tracking their mobile phones. These users could then be provided with special offers on their favorite products, or even location of items that they need, which their fridge has automatically conveyed to the phone. Additional examples include enabling extended home security features and home automation. Now with IoT, one can control household electrical devices while being away from home.

An IoT device is typically insecure, especially when accessing user data, which can be a cause for security concerns. Most of the IoT devices may not have the means or capabilities for processing and/or storing data securely, e.g., by using complex encryption. In some cases, the IoT devices have been shown to be vulnerable to attackers who have access to the onboard network. Some technologies control sessions of the IoT devices by issuing tokens to the IoT devices. The tokens provide as a means to authenticate the IoT device and allow the IoT device to perform a specified function. However, such tokens may be copied easily and used from some other devices. The tokens can be copied legitimately and reused on other devices. However, the problem with reusing the same token on different devices is that when the token is revoked, all devices having the token would lose access to an application to which the IoT devices are connected.

BRIEF DESCRIPTION OF THE DRAWINGS

FIG. 8 is a block diagram of a processing system that can implement operations, consistent with various embodiments.

DETAILED DESCRIPTION

Figure 1:
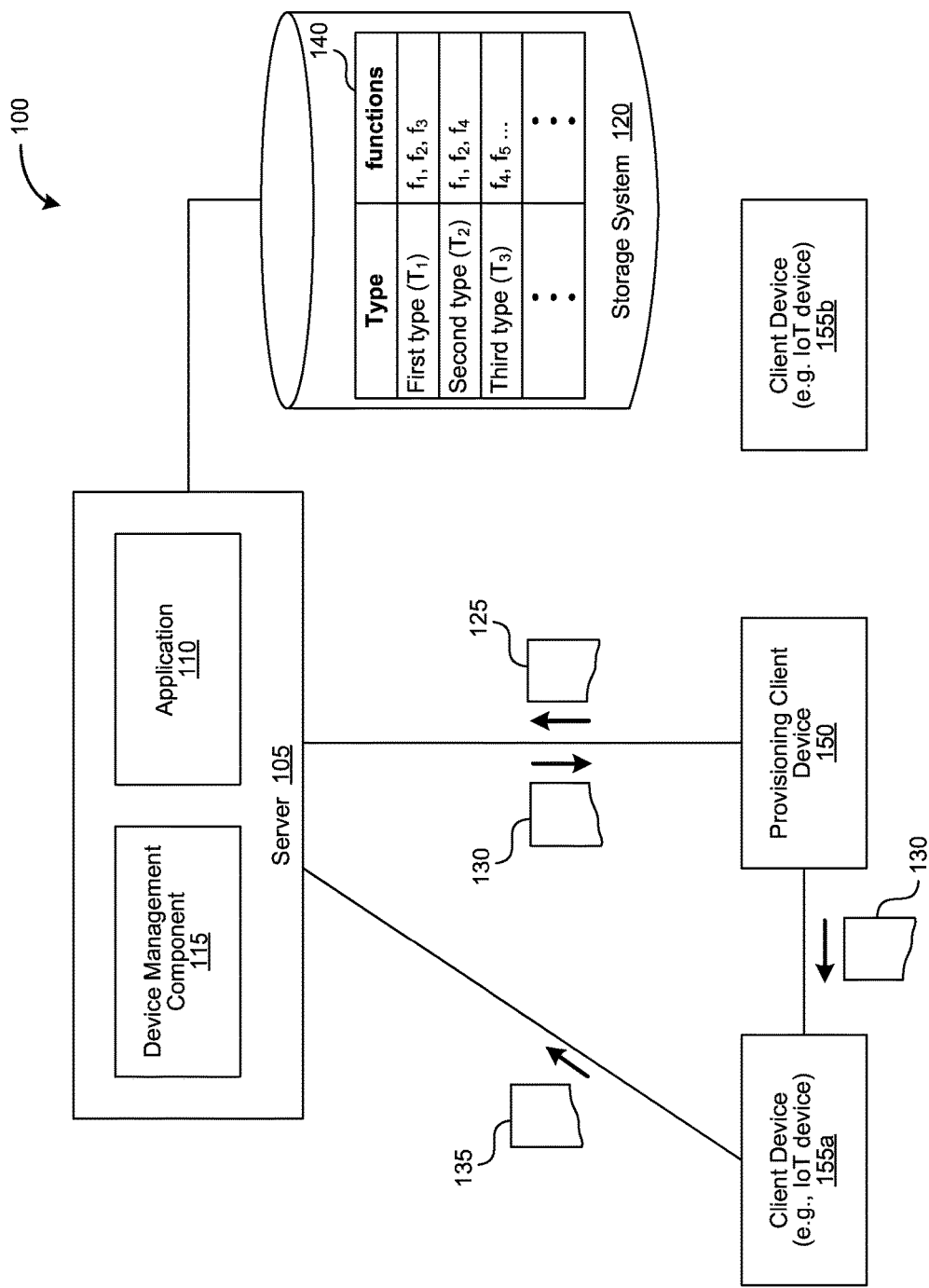
FIG. 1 is a block diagram illustrating an environment in which the disclosed embodiments may be implemented.

Embodiments are disclosed for security management in communications involving computing devices, e.g., Internet of Things (IoT) devices. An IoT device can perform various activities, e.g., social networking activities, for or on behalf of a user. An IoT device is typically insecure, especially when accessing user data. To control the type of activities that can be performed by various types of devices, a server computing device ("server") can issue different types of tokens to different IoT devices. Which token an IoT device has determines the types of activities of an application, e.g., social networking application, the IoT device can perform. For example, the server can issue a restricted token to an IoT device, which restricts the type of activities an IoT device can perform, and a normal/unrestricted token to a more secure device, e.g., a smartphone, that can perform a broader range of activities, e.g., all activities of the application. In one example, the restrictive token would not permit the IoT device to perform activities such as changing the password of a user.

The type of activities a restrictive token permits an IoT device to perform can also depend on a type of the IoT device, among other factors. For example, a restricted token issued to a first IoT device, such as an alarm clock, can permit the first IoT device to access a user's calendar and generate alerts or notifications as a reminder for events and/or other meetings on the calendar. A restricted token issued to a second IoT device, such as a fitness monitoring device, can permit the second IoT device to share fitness related information of the user, e.g., a number of miles ran by the user, with friends of the user on a social networking application. The restrictive tokens issued to both the devices may not permit the devices to change the profile information, e.g., password, of the user in the social networking application. In some embodiments, at least some of the type of activities that a restrictive token allows an IoT device to perform can be configured by the user.

The IoT devices are provisioned using a provisioning computing device ("provisioning device"), e.g., an authenticated and/or trusted device, e.g., a smartphone, which can typically be a device with an unrestricted token that permits the device to perform a broad range of activities of the application, including provisioning other devices. The IoT device can typically be less trusted device than the provisioning device, e.g., smartphone, and therefore, may not obtain the token from the server directly. When the provisioning device issues a request for generating a token for an IoT device, the server authenticates the provisioning device, e.g., at the server, determines whether the provisioning device has an unrestricted token and then generates the token if the authentication process is successful. For example, a mobile app, e.g., a client portion of the social networking application, on the smartphone can indicate the type of IoT device to the server, obtain the token from the server, and then send it to the IoT device, after which the IoT device can communicate with the server directly, e.g., to perform activities associated with the application.

When the server receives a request from the IoT device for performing a specified function, the server extracts the token from the IoT device and determines if a session has already been established for the IoT device. If the session has already been established for the IoT device, the server determines if the token is permitted to execute the specified function, and if it is permitted, the server allows the IoT device to execute the specified function. If the token is not permitted to execute the specified function, the server can send an error message indicating that the IoT device is not permitted to execute the specified function.

The tokens issued to the IoT devices are revocable. For example, if an IoT device is stolen, the user can request the server to revoke the token issued to the IoT device. The server can revoke the access to the IoT device, e.g., by deleting the session associated with the IoT device. In some embodiments, the user can revoke access to a set of IoT devices provisioned by the user. For example, the user can request the server to revoke access to all IoT devices of a specified type, e.g., portable audio speakers. The server can revoke access to the IoT devices of the specified type, e.g., by deleting sessions associated with the IoT devices of the specified type.

In some embodiments, provisioning the IoT device via another device, e.g., an authenticated device such as a smartphone, can prevent provisioning of the IoT device by an unauthorized user by accessing the IoT device directly. The unauthorized user may also not be able to convert the restricted token issued to an IoT device to an unrestricted token since the server can determine that the IoT device is not an authenticated device and therefore, may not have an unrestricted token.

Further, the tokens issued to the IoT devices are unique, e.g., a token issued to a specified IoT device is unique to that IoT device. The token issued to one IoT device may not be used by another IoT device, thereby preventing unauthorized provisioning of IoT devices by copying of a token device from one IoT device to another. In some embodiments, assigning unique tokens to the IoT devices can also enable the user to revoke access to the IoT devices selectively, e.g., can identify a specified IoT device or set of IoT devices for which the access need to be revoked.

In some embodiments, the ability to provision different IoT devices and/or different types of IoT devices with different restricted tokens enables a user to define different sets of functions to be permitted for different IoT devices and/or for different types of IoT devices.

Note that the document describes the provisioning device that provisions the IoT devices as a smartphone. However, the provisioning device is not restricted to a smartphone and can include any type of computing device, e.g., a desktop, a laptop, a tablet PC, using which the user can log in to the application and authenticate himself to the application. The provisioning device can include a device that can be authenticated by the server as a trusted device, that has specified hardware and/or software resources to provide secure communication means with the server, and/or a device to which an unrestricted token can be issued. The computing devices that can be provisioned by a provisioning device are not restricted to IoT devices and can be any computing device that is capable of communicating with the application executing at the server and executing one or more functions associated with the application.

Turning now to the figures, FIG. 1 depicts a block diagram illustrating an environment 100 in which the disclosed embodiments may be implemented. The environment 100 includes a server 105 at which an application 110, e.g., a social networking application, can be implemented. Users can access the application 110 using a client computing device ("client device") 150 and/or client devices 155a and 155b (collectively referred to as "client devices 155"). In some embodiments, the client device 150 is a smartphone, a desktop PC, a laptop or a tablet PC, etc., and the client devices 155 are IoT devices. In some embodiments, a client device 155a can be configured to access the application 110, e.g., perform one or more functions associated with the application 110, by provisioning the client device 155a via the client device 150. Henceforth, the client device 150 is also referred to as a "provisioning device 150," and the client devices 155 are also referred to as provisioned devices and/or "IoT devices 155."

In some embodiments, the provisioning device 150 is a computing device using which the user can log in to the application 110 and authenticate himself/herself to the application 110, e.g., by providing user credentials such as a username and password via the device. The provisioning device 150 can also include a device that can be authenticated by the server 105 as a trusted device and/or a device that has specified hardware and/or software resources to provide secure communication means with the server 105. Typically, the client devices 155 are computing devices that can have less software and/or hardware resources than that of the provisioning device 150 and provide less secure communication than the provisioning device 150. The client devices 155 are not restricted to IoT devices and can be any computing devices that are capable of communicating with the application 110 and executing one or more functions associated with the application 110.

The server 105 can include a device management component 115 that can be used for provisioning the IoT devices 155. In some embodiments, the client devices 155 are provisioned by issuing tokens, e.g., a token 130. A token can be associated with a set of functions of the application 110, which an IoT device possessing the token is permitted to execute. A token can be of various types, e.g., an unrestricted token and a restricted token. In one example, the restricted token would not permit the IoT devices 155 to perform activities such as changing the password of a user. In some embodiments, the restricted token restricts the type of functions an IoT device can execute, e.g., to a subset of functions of the application 110, and an unrestricted token permits the IoT device to execute a broader range of functions of the application 110, e.g., all functions of the application 110. In other words, the restrictive token may not permit the IoT device to perform a specified set of functions of the application 110.

In some embodiments, the tokens are issued to the IoT devices 155 via the provisioning device 150. In some embodiments, the provisioning device 150 can request the server 105 to provision an IoT device, e.g., IoT device 155a, only if the provisioning device 150 is successfully authenticated by the server 105. Authentication of the provisioning device 150 can include a user logging into the application 110, e.g., at a mobile app executing at the provisioning device 150, the server 105 authenticating the user and establishing the provisioning device 150 as a trusted device. The server 105 can also issue an unrestricted token to the provisioning device 150 upon successful authentication. In some embodiments, the provisioning device 150 can provision the IoT devices 155 only if the provisioning device 150 has an unrestricted token.

To provision the IoT device 155a, the provisioning device 150 can issue a first request 125 to the device management component 115. The first request 125 can also include a type of the IoT device 155. Upon receiving the first request 125, the device management component 115 can generate a restricted session to generate a restricted token, e.g., token 130, to be issued to the IoT device 155a. The device management component 115 can generate the token 130 based on the type of the IoT device 155a. The token 130 is associated with a set of functions of the application 110, which the IoT device 155a can execute. The device management component 115 can then send the token 130 to the provisioning device 150 for provisioning the IoT device 155a. Upon receiving the token 130, the provisioning device 150 issues the token 130 to the IoT device 155a.

The IoT device 155a can use the token 130 to communicate with the server 105 directly. For example, the IoT device 155a can use the token 130 to issue a second request 135 to the server 105 for executing a specified function of the application 110. The server 105 can determine if the token 130 is permitted to execute the specified function and, if the token 130 is associated with the specified function, permit the IoT device to execute the specified function.

The type of functions a restrictive token permits an IoT device to perform can depend on various factors, e.g., a type of the IoT device. The server 105 can store information regarding the functions a specified type of the IoT device can perform in a storage system 120, e.g., as a first table 140. The first table 140 indicates that an IoT device of the first type "$T_1$" is associated with functions "$f_1$," "$f_2$," and "$f_3$" of the application 110. In other words, a restricted token issued for an IoT device of the first type permits the IoT device to execute the functions "$f_1$," "$f_2$," and "$f_3$" of the application 110. Similarly, a restricted token issued for an IoT device of the second type permits the IoT device to execute the functions "$f_1$," "$f_2$," and "$f_4$" of the application 110. For example, a restricted token issued to the IoT device 155a, e.g., an alarm clock, can permit the IoT device 155a to access a user's calendar and generate alerts or notifications as a reminder for events and/or other meetings on the calendar of the user. A restricted token issued to the IoT device 155b, e.g., a fitness monitoring device, can permit the IoT device 155b to share fitness related information of the user, e.g., a number of miles ran by the user, with friends of the user in the application 110. The restrictive tokens issued to the IoT devices 155 may not permit the IoT devices 155 to perform a specified function or functions, e.g., changing user profile information, such as a password, of the user in the application 110. In some embodiments, at least some of the activities that a restrictive token allows an IoT device to perform can be configured by the user. In some embodiments, the first table 140 can indicate the functions that may not be executed by a specified type of the IoT device in addition to or instead of the functions that may be executed by the specified type of the IoT device.

The provisioning device 150 can send the token 130 to the IoT device 155a via wired and/or wireless means. For example, the provisioning device 150 can send the token 130 to the IoT device 155a via Bluetooth. In another example, if the IoT device 155a can act as a wireless access point, the provisioning device 150 can send the token 130 via Wi-Fi direct. The provisioning device 150 can provision a number of IoT devices 155. The token issued to an IoT device is unique to that IoT device.

The device management component 115 can be implemented as part of the server 105 or implemented as a separate system or can be implemented as a distributed computing system in which different components of the device management component 115 can be distributed over a number of systems.

Figure 2:
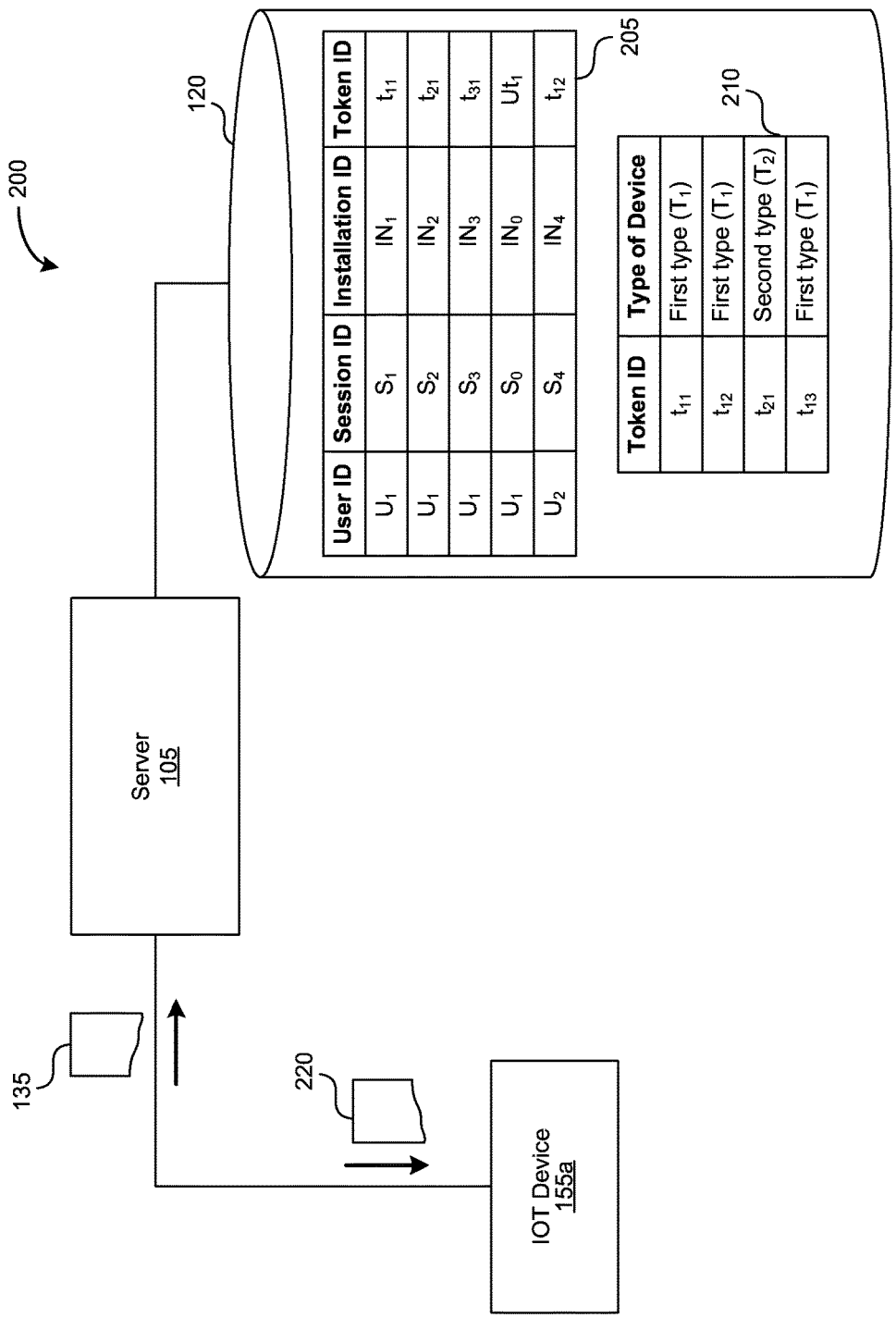
FIG. 2 depicts a block diagram illustrating a communication between an IoT device and the server of FIG. 1, consistent with various embodiments.

FIG. 2 depicts a block diagram illustrating a communication between an IoT device and the server 105 of FIG. 1, consistent with various embodiments. After an IoT device, e.g., the IoT device 155a, is provisioned to work with the application 110 by the provisioning device 150, the IoT device 155a can communicate with the application 110 at the server 105 directly. For example, the IoT device 155a can send a second request 135 to the server 105 for executing a specified function of the application 110. The IoT device 155a can send the token 130 it received from the provisioning device 150 as part of the second request 135.

The server 105, e.g., device management component 115, determines if a session data object with which the token 130 is associated is available at the server 105. A session data object contains data associated with a session between the server 105 and the IoT device 155a. In some embodiments, a session is a semi-permanent interactive information interchange, also known as a dialogue, a conversation or a meeting, between two or more communicating devices, e.g., the server 105 and IoT device 155a, the server 105 and provisioning device 150, or between a computer and a user. A session can be set up or established at a specified point in time, e.g., when the token for the IoT device is generated, and then deleted at some later point, e.g., expiry of a specified duration. An established communication session may involve more than one message in each direction. A session is typically, but not always, stateful, meaning that at least one of the communicating parts needs to save information about the session history in order to be able to communicate, as opposed to stateless communication, where the communication consists of independent requests with responses.

In some embodiments, a session data object is created when a token is generated for being issued to an IoT device. The session data object can include a variety of data, e.g., a token issued for an IoT device, an installation identifier (ID) of the IoT device, a user ID of the user with which the IoT device is associated, and any other data that can be used by the IoT device or the server 105 in executing the functions that the IoT device is permitted to execute. In some embodiments, a token is a unique ID generated for a specified IoT device and is associated with a single session data object at the server 105. An installation ID is an ID that can uniquely identify the IoT device. The installation ID can be a device ID that is provided by the IoT device, e.g., assigned by a manufacturer of the IoT device, or can be generated by the IoT device, the provisioning device 150 or the server 105. The session data object can also have a session ID that uniquely identifies the session data object.

When a user requests the server 105 to provision the IoT device 155a, the device management component 115 generates a token, e.g., token 130 for the IoT device 155a, generates a session data object for storing data associated with a session between the IoT device 155a and the server 105. The device management component 115 can also associate the session data object with the token 130, the user ID of the user and the installation ID of the IoT device 155a. The device management component 115 can store the association between the session data object and various other IDs in one or more tables, e.g., a second table 205, at the storage system 120. The device management component 115 can also store an association between a token and the type of the IoT device for which the token is generated in one or more tables, e.g., third table 210, at the storage system 120. In some embodiments, the third table 210 can be used to determine the set of functions that an IoT device for which a specified token is generated can execute. Although the third table 210 associates a token issued to an IoT device to a type of the IoT device, in other examples, the token can be associated with any criteria that are used to determine a set of functions an IoT device can execute.

When the server 105 receives the second request 135 from the IoT device 155a, the device management component 115 determines if the session data object with which the token 130 is associated is available at the server 105, e.g., by using the second table 205. If the session data object is available, then the device management component 115 can determine if the token 130 is permitted to execute the specified function. In some embodiments, the device management component 115 can use the third table 210 to determine the type of the IoT device 155a with which the token 130 is associated and then use the first table 140 to determine if that type of IoT device is permitted to execute the specified function. If the device management component 115 determines that the identified type of the IoT device is permitted to execute the specified function, the device management component 115 permits the IoT device 155a to execute the specified function. If the session data object is not available at the server 105 and/or if the token 130 is not permitted to execute the specified function, the device management component 115 can send an appropriate error message 220 to the IoT device 155a. The error message 220 can indicate that the session has been terminated or that the session cannot be identified, or that the device is not permitted to execute the specified function.

After the IoT device 155a is provisioned, the IoT device 155a may access data associated with the user of the provisioning device 150 (if the token 130 permits) even when the provisioning device 150 is offline, e.g., not connected to the server 105. For example, if the IoT device 155a is an alarm clock, the alarm clock can access the meeting invites or any other events in the calendar of the user on the provisioning device 150, e.g., a smartphone, even if the provisioning device 150 is offline. However, in some embodiments, in order to facilitate the IoT device 155a to access data of the user that is on the provisioning device 150 even when the provisioning device 150 is offline, the provisioning device 150 may have to be synchronized with the server 105, e.g., to store the data at the server 105 in the storage system 120.

In some embodiments, the IoT device 155a may be configured to communicate with the server 105, e.g., access the specified function of the application 110 executing at the server 105, via the provisioning device 150. The provisioning device 150 can act as a proxy and relay the request from the IoT device 115a to the server 105.

Figure 3:
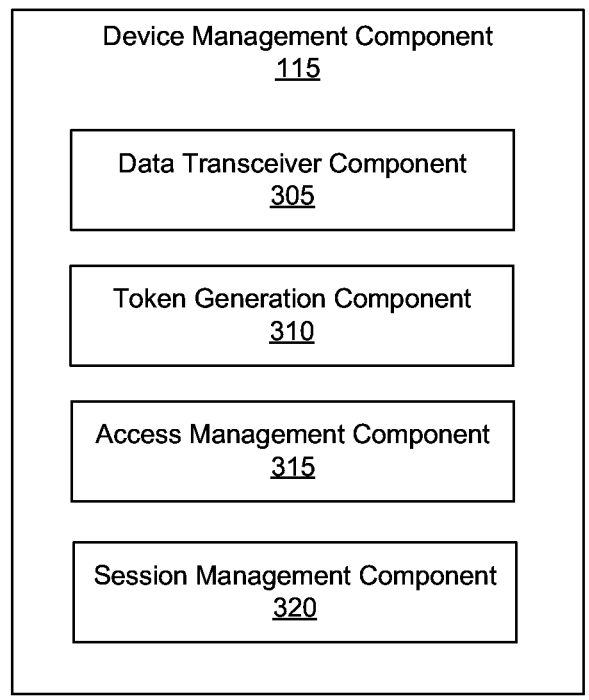
FIG. 3 is a block diagram of the device management component of FIG. 1, consistent with various embodiments.

FIG. 3 is a block diagram of the device management component of FIG. 1, consistent with various embodiments. The device management component 115 can include a data transceiver component 305, a token generation component 310, an access management component 315 and a session management component 320. The data transceiver component 305 can receive various requests from client devices. For example, the data transceiver component 305 can receive a request from a provisioning device for generating tokens, retrieving a list of devices provisioned by a user, and revoking access to one or more provisioned devices, e.g., IoT devices 155. In another example, the data transceiver component 305 can receive a request from a provisioned device, e.g., IoT device 155a for executing a specified function. In another example, the data transceiver component 305 can send data to the provisioning device, e.g., tokens, and the provisioned device, e.g., data requested as part of the specified function.

The token generation component 310 can generate a token, e.g., token 130, to be issued to an IoT device, e.g., IoT device 155a as described at least with reference to FIG. 1. The token can provide access for the IoT device to a set of functions of an application, e.g., the application 110. The token can be a restricted token, which can restrict the access for an IoT device to a subset of functions of the application 100, or an unrestricted token, which can provide access to a client device for a broad range of functions of the application 110.

The access management component 315 can be used to define a set of functions of the application 110 that can be executed by an IoT device having a specified token. When the device management component 115 receives a request from the IoT device for executing a specified function, the access management component 315 can determine whether the IoT device is permitted to execute the specified function based on the token issued to the IoT device.

The session management component 320 manages a session between an IoT device and the server. The session management component 320 can generate the session data object and associate the session data object with the appropriate user ID of the user requesting provisioning of an IoT device, an installation ID of the IoT device, and a token generated for the IoT device, e.g., as described at least with reference to FIG. 2.

Additional details with respect to the device management component 115 are described at least with reference to FIGS. 4-7 and the following paragraphs.

Note that the device management component 115 is not restricted to the above components. The device management component 115 can include lesser number of components, e.g., functionalities of two components can be combined into one component, or can include more number of components, e.g., components that perform other functionalities or functionalities of a component can be split into two or more components. Further, in some embodiments, the device management component 115 can be implemented as a distributed system, e.g., the components of the device management component 115 can be distributed over various systems.

Figure 4:
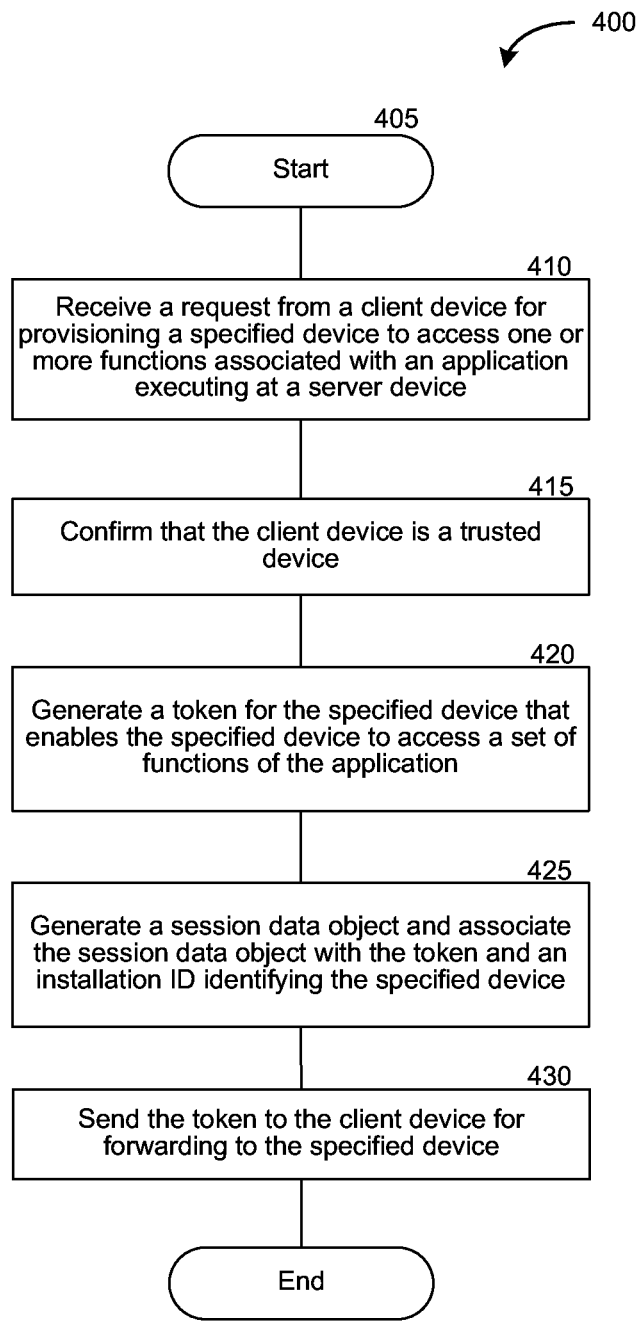
FIG. 4 is a flow diagram of a process of provisioning an IoT device, consistent with various embodiments.

FIG. 4 is a flow diagram of a process 400 of provisioning an IoT device, consistent with various embodiments. In some embodiments, the process 400 may be implemented in the environment 100 of FIG. 1 and using the server 105. The process 400 begins at block 405, and at block 410, the data transceiver component 305 receives a request from a client device, e.g., provisioning device 150, for provisioning a specified computing device, e.g., IoT device 155a, to access one or more functions associated with an application executing at a server, e.g., application 110 at the server 105.

At block 415, the token generation component 310 confirms that the provisioning device 150 is a trusted device. In some embodiments, the token generation component 310 confirms that the provisioning device 150 is a trusted device if the user has authenticated himself or herself to the application 110 by inputting the user credentials via the provisioning device 150. The trusted device is typically issued an unrestricted token. If the provisioning device 150 does not have an unrestricted token, the provisioning device 150 may not be allowed to provision other devices. If the token generation component 310 determines that the provisioning device 150 is not a trusted device, the provisioning device 150 may not be allowed to provision other devices and the process 400 returns.

At block 420, the token generation component 310 generates a token, e.g., token 130, for the IoT device 155a. In some embodiments, the token is a unique ID generated for a specified IoT device, and can be used to identify a set of functions that the IoT device 155a can access. A token can be of various types, e.g., an unrestricted token and a restricted token. In some embodiments, the restricted token restricts the type of functions an IoT device can execute, e.g., to a subset of functions of the application 110, and an unrestricted token permits the IoT device to execute a broader range of functions of the application 110, e.g., all functions of the application 110. In one example, the restricted token would not permit the IoT device 155a to perform activities such as changing the password of a user.

In some embodiments, the restricted token is issued to less trusted devices, e.g., IoT devices, that do not have sufficient hardware and/or software resources to carry out secure communications. However, the user may configure the server 105 to issue restricted tokens to any device the user prefers. The token 130 can be a restricted token.

Further, different types of restricted tokens can be issued to different devices, and different types of restricted tokens can be associated with different functions. In some embodiments, the set of functions that a device can access and/or execute depends on a type of the device among other factors. Accordingly, the token generation component 310 can generate the token 130 based on the type of the IoT device 155a. The access management component 315 can store information regarding the functions that a specified type of the IoT device can perform in a storage system 120, e.g., as a first table 140. For example, the first table 140 indicates that an IoT device of the first type "$T_1$" is associated with or can access functions "$f_1$," "$f_2$," and "$f_3$" of the application 110. In other words, a restricted token issued for an IoT device of the first type permits the IoT device to execute the functions "$f_1$," "$f_2$," and "$f_3$" of the application 110.

A user, e.g., an administrator of the application 110, can define the set of functions that can be accessed by a specified type of IoT device. In some embodiments, the user associated with the provisioning device 150 can also define and/or customize the set of functions an IoT device can access. The user may use the access management component 315 to define and/or customize the set of functions to be associated with a type of the IoT device.

At block 425, the session management component 320 generates a session data object and associates the session data object with the token. The session management component 320 can store a variety of data associated with a session between the server 105 and the IoT device 155a in the session data object. For example, the session data object can include a token issued for an IoT device, an installation ID of the IoT device, a user ID of the user with which the IoT device is associated, and any other data that can be used by the IoT device or the server 105 in executing the functions that the IoT device is permitted to execute.

At block 430, the data transceiver component 305 sends the token 130 to the provisioning device 150 for forwarding to the IoT device 155a. In some embodiments, the provisioning device 150 can provision a number of IoT devices.

After the provisioning device 150 receives the token 130 from the server 105, the provisioning device 150 can send the token 130 to the IoT device 155a via wired or wireless means.

Figure 5:
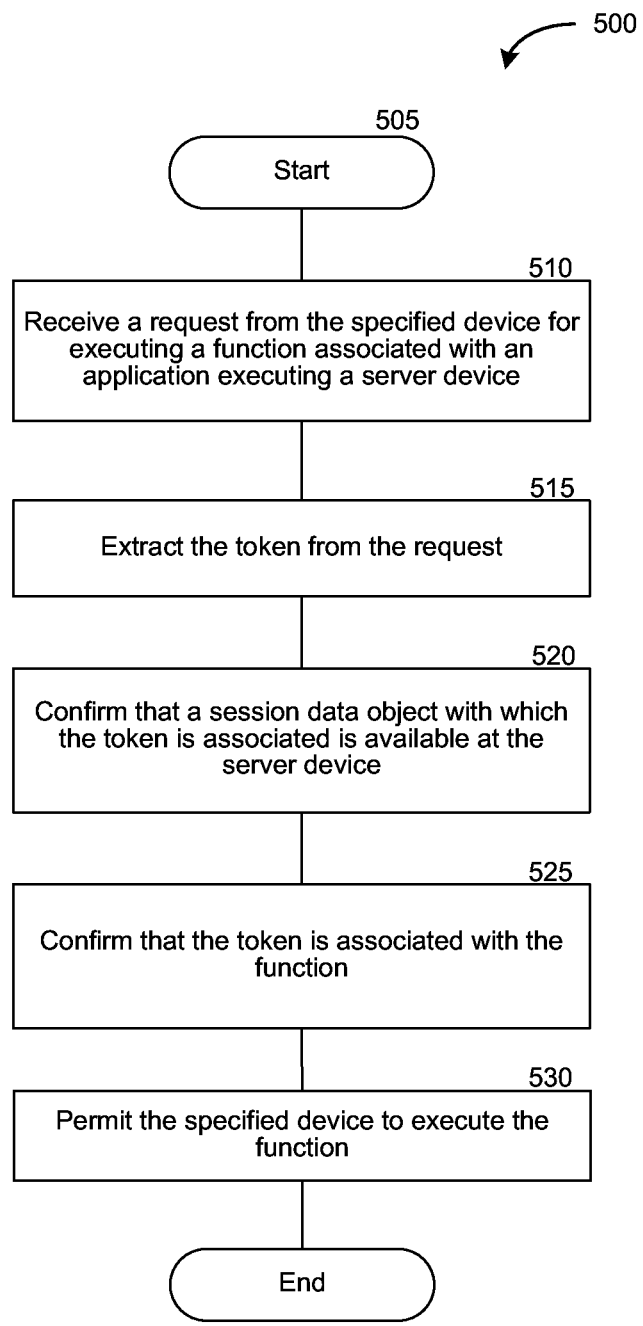
FIG. 5 is a flow diagram of a process of processing a request from an IoT device for executing a specified function associated with an application, consistent with various embodiments.

FIG. 5 is a flow diagram of a process 500 of processing a request from an IoT device for executing a specified function associated with an application, consistent with various embodiments. In some embodiments, the process 500 may be implemented in the environment 100 of FIG. 1 and using the server 105. The process 500 begins at block 505, and at block 510, the data transceiver component 305 receives a request from a specified device, e.g., IoT device 155a, for accessing a specified function associated with the application 110. In some embodiments, the IoT device 155a is a device that is provisioned by the provisioning device 150 to enable the IoT device 155a to access one or more functions associated with the application 110.

At block 515, the token generation component 310 can extract the token, e.g., token 130, from the request.

At block 520, the session management component 320 confirms that a session data object with which the token is associated is available at the server 105. In some embodiments, the session management component 320 can use the second table 205 to determine whether the session data object with which the token 130 is associated is available. For example, the second table 205 indicates that the token 130 "$t_{11}$" is associated with the session data object "$S_1$."

If the session data object is not available at the server 105, the data transceiver component 305 can send an error message to the IoT device 155a, and the process 500 returns. The error message can indicate that a session associated with the IoT device 155a is either unavailable or has expired and therefore, the IoT device 155a cannot access the specified function of the application 110.

If the session management component 320 successfully confirms that session data object is available, at block 525, the access management component 315 confirms that the token 130 is associated with the specified function. In some embodiments, the access management component 315 can use the third table 210 and the first table 140 to determine whether the token 130 is associated with the specified function. For example, the third table 210 indicates that the token 130 "$t_{11}$" is associated with an IoT device of the first type "$T_1$" and the first table 140 indicates that the IoT device of the first type "$T_1$" is associated with the functions "$f_1$," "$f_2$," and "$f_3$."

If the specified function is one of "$f_1$," "$f_2$," and "$f_3$," at block 530, the access management component 315 permits the IoT device 155a to execute the specified function, and the process 500 returns. On the other hand, if the access management component 315 determines that the token 130 is not associated with the specified function, the data transceiver component 305 sends an error message to the IoT device indicating that the IoT device 155a is forbidden from accessing the specified function.

Figure 6:
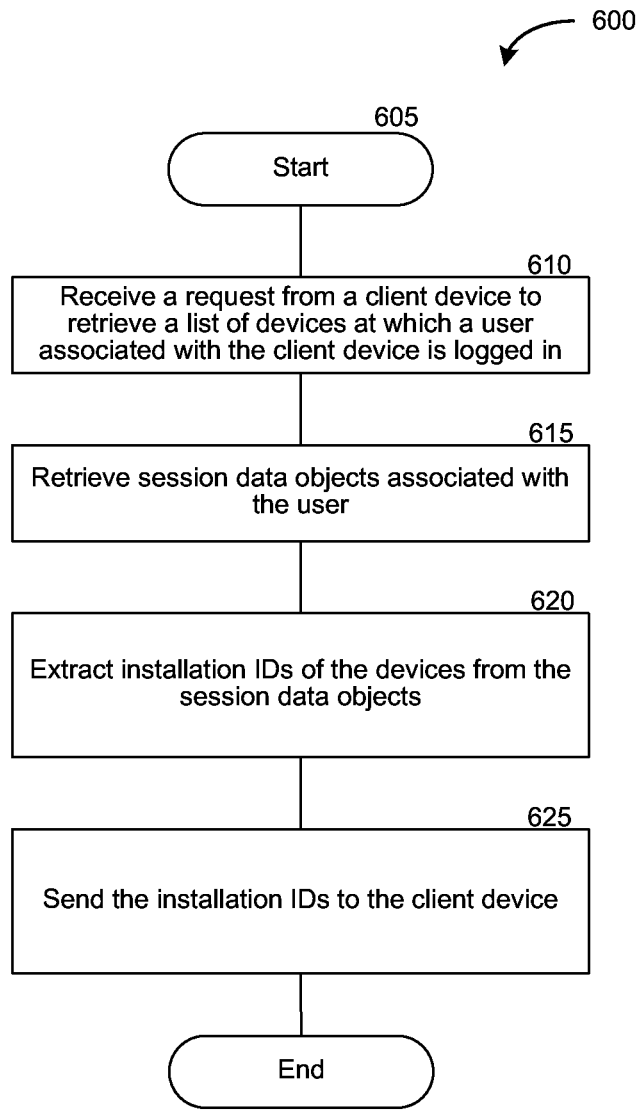
FIG. 6 is a flow diagram of a process of retrieving a list of devices provisioned by a user, consistent with various embodiments.

FIG. 6 is a flow diagram of a process 600 of retrieving a list of devices provisioned by a user, consistent with various embodiments. In some embodiments, the process 600 may be implemented in the environment 100 of FIG. 1 and using the server 105. The process 600 begins at block 605, and at block 610, the data transceiver component 305 receives a request from a client device, e.g., the provisioning device 150, to retrieve a list of devices provisioned by the user or devices at which a user associated with the provisioning device 150 is logged in.

At block 615, the session management component 320 identifies the session data objects associated with the user. In some embodiments, the session management component 320 can use the second table 205 to retrieve the session data objects associated with the user. For example, the second table 205 indicates that the session data objects "$S_1$," "$S_2$," and "$S_3$" are associated with the user "$U_1$."

At block 620, the session management component 320 extracts the installation IDs of the devices from the identified session data objects. For example, the second table 205 indicates that the session data objects "$S_1$," "$S_2$," and "$S_3$" associated with the user "$U_1$" are associated with the installations "$IN_1$," "$IN_2$," and "$IN_3$." In some embodiments, the installation ID uniquely identifies a client device connected to the server 105, e.g., the provisioning device 150 and/or the provisioned devices, e.g., IoT devices 155. For example, the installation ID, "$IN_1$" can correspond to the IoT device 155a, the installation ID, "$IN_2$," can correspond to the IoT device 155b, the installation ID, "$IN_3$," can correspond to the IoT device 155c (not illustrated), and the installation ID, "$IN_0$" can correspond to the provisioning device 150.

At block 625, the data transceiver component 305 sends the installation IDs to the provisioning device 150.

Figure 7:
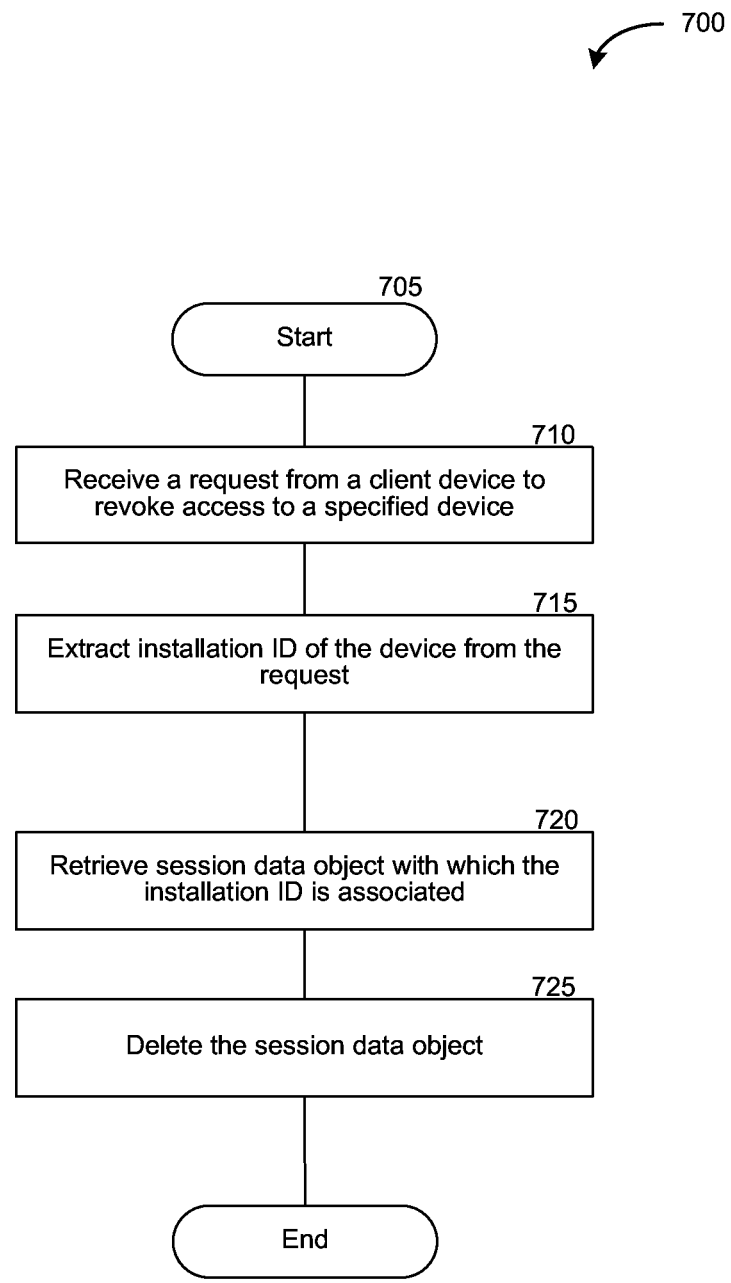
FIG. 7 is a flow diagram of a process of revoking access to a provisioned device, consistent with various embodiments.

FIG. 7 is a flow diagram of a process 700 of revoking access to a provisioned device, consistent with various embodiments. In some embodiments, the process 700 may be implemented in the environment 100 of FIG. 1 and using the server 105. The process 700 begins at block 705, and at block 710, the data transceiver component 305 receives a request from the provisioning device 150 for revoking access to a specified provisioned device, e.g., IoT device 155a.

At block 715, the session management component 320 extracts the installation ID, e.g., "$IN_1$," from the request. The provisioning device 150 can obtain the installation IDs of the devices provisioned by the user from the server 105, e.g., as described at least with reference to FIG. 6.

At block 720, the session management component 320 retrieves the session data object with which the installation ID is associated. In some embodiments, the session management component 320 uses the second table 205 to determine the session data object associated with the installation ID. For example, the session management component 320 determines that the session data object with session ID "$S_1$" is associated with the installation ID "$IN_1$."

At block 725, the session management component 320 deletes the identified session data object to revoke the access to the corresponding IoT device. After the session data object is deleted, the IoT device may not access or execute the functions associated with the application 110 anymore. Any access request from the IoT device will be responded to with an error message indicating that there are no active sessions associated with the device and that the device may have to be provisioned again by the provisioning device 150 to obtain access to the application 110.

If the IoT device 155a is not able to connect to the server 105, e.g., because the session associated with the IoT device 155a has expired, an alert may be generated at the provisioning device 150 indicating that the IoT device 155a has disconnected from the server 105 and is requesting to be connected again. The user can then provision the IoT device 155a, e.g., as described at least with reference to FIGS. 1 and 4.

In some embodiments, the session associated with an IoT device can be deleted based on a predefined criterion, e.g., expiry of a predefined period. The user can define the criterion or customize the predefined criterion for deleting a session associated with the IoT device.

In some embodiments, the user can also revoke access to one or more devices of a specified type. For example, the user can specify the type of the IoT devices for which the access is to be revoked. The server 105 can determine the tokens associated with all of the devices of the specified type, and delete the session data objects with which the determined tokens are associated. Like the type of an IoT device, the user can use various other attributes, e.g., of or associated with the IoT devices, to identify the IoT devices for which the access is to be revoked.

FIG. 8 is a block diagram of a computer system as may be used to implement features of the disclosed embodiments. The computing system 800 may be used to implement any of the entities, components or services depicted in the examples of the foregoing figures (and any other components and/or modules described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
    receiving, from a client computing device, a first request for provisioning a token that enables a specified computing device to communicate with an application executing at a server computing device;
    generating the token for the specified computing device, wherein the token is associated with a set of functions that the specified computing device is allowed to execute;
    sending the token to the client computing device;
    causing the client computing device to send the token to the specified computing device;
    receiving, at the server computing device and from the specified computing device, a request for performing a specified function;
    determining whether the server computing device has a session data object associated with the specified computing device, the session data object having the token and an installation ID of the specified computing device and generated at the server computing device in response to generating the token;
    permitting the specified computing device to perform the specified function in an event the session data object is available at the server computing device;
    receiving, at the computing system, a revoke request from the client computing device to revoke access for a specified type of computing devices provisioned by the client computing device;
    identifying session objects having tokens generated for the computing devices of the specified type; and
    deleting the session objects to revoke the access for the specified type of computing devices.

2. The method of claim 1 further comprising:
    receiving, at the server computing device and from the specified computing device, a second request for performing a function;
    extracting, by the server computing device, the token from the second request;
    determining, at the server computing device, whether the token is associated with the function; and
    responsive to a determination that the token is associated with the function, permitting the specified computing device to execute the function.

3. The method of claim 1, wherein the specified computing device includes an Internet of Things (IoT) device.

4. The method of claim 1, wherein generating the token includes generating an unrestricted token that allows the specified computing device to execute any of a plurality of functions of the application.

5. The method of claim 1, wherein generating the token includes generating a restricted token that restricts the specified computing device to a subset of a plurality of functions of the application.

6. The method of claim 5 further comprising:
    generating different restricted tokens for different specified computing devices, wherein at least some of the different restricted tokens are associated with different subsets of the plurality of the functions.

7. The method of claim 1, wherein generating the token includes:
    determining a type of the specified computing device, and
    associating the token with the set of functions of the application that is defined for the type of the specified computing device.

8. The method of claim 7, wherein determining the type of the specified computing device includes determining the type based on device identification information of the specified computing device provided by the client computing device.

9. The method of claim 1, wherein generating the token includes:
    determining if the client computing device is trusted by the server computing device, and
    responsive to a determination that the client computing device is trusted by the server computing device, generating the token for provisioning by the client computing device.

10. The method of claim 9, wherein determining if the client computing device is trusted includes confirming that the client computing device is authenticated by the server computing device.

11. The method of claim 9, wherein determining if the client computing device is trusted includes confirming that the client computing device has an unrestricted token that allows the client computing device to execute all of a plurality of functions of the application.

12. The method of claim 1 further comprising:
generating, at the computing system, a session data object, the session data object including the token, an installation identifier (ID) identifying the specified computing device for which the session data object is generated, and a user ID of a user associated with the client computing device.

13. A non-transitory computer-readable storage medium storing computer-readable instructions, comprising:
instructions for receiving, at a server computing device and from a specified computing device, a first request for performing a function associated with an application executing at the server computing device, wherein the specified computing device is provisioned to work with the application by a client computing device;
instructions for extracting, by the server computing device, a token from the first request, wherein the token identifies a set of functions the specified computing device is permitted to execute, and wherein the token is provisioned to the specified computing device via the client computing device during a registration process of the specified computing device;
instructions for determining, at the server computing device, whether the token is associated with the function; and
instructions for permitting the specified computing device to execute the function responsive to a determination that the token is associated with the function, wherein permitting the specified computing device to execute the function includes:
determining whether the server computing device has a session data object associated with the specified computing device, the session data object having the token and an installation ID of the specified computing device,
performing the function in an event the session data object is available at the server computing device, and
notifying the specified computing device regarding a failure of the first request; and
instructions for revoking access for a specified type of computing devices provisioned by the client computing device, wherein revoking access for the specified type of computing devices includes:
receiving a revoke request from the client computing device to revoke access for the specified type of computing devices provisioned by the client computing device;
identifying session objects having tokens generated for the computing devices of the specified type; and
deleting the session objects to revoke the access for the specified type of computing devices.

14. The non-transitory computer-readable storage medium of claim 13 further comprising:
notifying the specified computing device that a session between the server computing device and the server computing device is disconnected; and
causing the specified computing device to request the client computing device to provision the specified computing device with a specified token that enables the specified computing device to communicate with server computing device to execute one or more functions of the application.

15. The non-transitory computer-readable storage medium of claim 13, wherein the instructions for receiving the first request include:
instructions for receiving the first request at the server computing device via a first computing device that acts as a proxy to the specified computing device, and
instructions for generating the token and a session data object for the first computing device, the session data object including the token and an installation ID associated with the first computing device.

16. The non-transitory computer-readable storage medium of claim 13 further comprising:
instructions for receiving a second request from the client computing device to retrieve a list of computing devices at which a user associated with the client computing device is logged in;
instructions for retrieving session data objects associated with the user, the session data objects created for the computing devices for which the client computing device has provisioned tokens from the server computing device, the session data objects including installation IDs of the computing devices for which the tokens are provisioned; and
instructions for sending the installation IDs to the client computing device.

17. The non-transitory computer-readable storage medium of claim 13 further comprising:
instructions for sending data associated with the client computing device to the specified computing device; and
instructions for causing the specified computing device to execute a specified function for the client computing device based on the data.

18. A system, comprising:
a processor;
a first component including instructions which, when executed by the processor, cause the system to receive, from a client computing device, a first request for provisioning a specified computing device with a token that enables the specified computing device to communicate with an application executing at a server computing device;
a second component including instructions which, when executed by the processor, cause the system to generate the token, wherein the token is associated with a set of functions that the specified computing device is allowed to execute, wherein the first component further includes instructions which, when executed by the processor, cause the system to:
send the token to the client computing device,
cause the client computing device to send the token to the specified computing device, and
receive, from the specified computing device, a request for performing a specified function;
a third component including instructions which, when executed by the processor, cause the system to determine whether the system has a session data object associated with the specified computing device, the session data object having the token and an installation ID of the specified computing device and generated at the server computing device in response to generating the token; and a fourth component including instructions which, when executed by the processor, cause the system to permit the specified computing device to perform the specified function in an event the session data object is available at the server computing device, wherein:

the first component further includes instructions which, when executed by the processor, cause the system to receive a revoke request from the client computing device to revoke access for a specified type of computing devices provisioned by the client computing device; and the third component further includes instructions which, when executed by the processor, cause the system to:
identify session objects having tokens generated for the computing devices of the specified type; and
delete the session objects to revoke the access for the specified type of computing devices.

* * * * *